Patented Apr. 23, 1940

2,198,205

UNITED STATES PATENT OFFICE 2,198,205

STABILIZING TOASTED CEREAL PRODUCTS

Sidney Musher, New York, N. Y., assignor to Musher Foundation Incorporated, New York, N. Y., a corporation of New York No Drawing. Application October 28, 1939, Serial No. 301,758

5 Claims. (Cl. 99—153)

This application relates to retarding deterioration of toasted or heat treated whole wheat cereal products and especially breakfast cereal products, and is a continuation in part of application, Serial No. 102,631 filed September 25, 1936.

A serious problem exists in retaining the original fresh flavor and retarding the development of "board" or "boxy" flavors and odors which develop rapidly particularly in the toasted cereal products during normal periods of storage or distribution.

An object of this invention is the retardation in the development of the objectionable off odors of the toasted cereal products and the retardation in the development of rancidity by the use of readily and cheaply available antioxygenic materials and those which do not require additional labeling or identification upon the finished toasted cereal packages.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In my prior application, Serial No. 261,667, filed March 13, 1939, which has matured into Patent 2,181,765, I have disclosed methods for producing cereal extracts, containing water soluble carbohydrates and organic nitrogen and phosphorus compounds, which may be added to food compositions or other similar organic materials subject to oxidative deterioration to help protect them against such oxidation.

According to this application, Serial No. 261,667, water soluble extracts are prepared desirably from the finely divided, unbleached dry milled cereals and cereal products. For example, cereal germs such as wheat germ, corn germ, rice germ and oat germ which may contain some of the bran and which may be desirably de-oiled to less than 10% glyceride oil and/or the meal portions of cereals such as oats, yellow or white maize or hominy, and barley, with or without dehulling or decorticating, may be mixed with water or alcohol or mixtures of water and alcohols at a temperature of about between 125° F. and 145° F. and at a pH between about 5.0 and 7.0 and desirably at a pH of 6.0 for 1 to 5 hours to remove the water or alcohol soluble materials from the cereals without substantial gelatinization, dextrinizing, solubilizing or conversion of the starch and proteins present in the cereals.

The water soluble cereal antioxygenic mixture which is substantially free of oil, starch and fibre, is obtained in clarified dilute aqueous solution after filtration, centrifuging or settling out of the water insoluble cereal residues, and may be concentrated desirably in a stainless steel vacuum pan to over about 50% total solids and desirably to about 70% solids.

It has now been found that when such an extract is utilized in concentrated or dilute solution for application to a breakfast cereal product, such cereal should be treated at a time when it is at a high temperature and desirably in excess of 250° F. such as just before final toasting in order for the extract to become sufficiently effective in stabilizing the cereal product.

The antioxygenic effect of the cereal extract thus obtained becomes materially enhanced as a result of contacting the cereal at the elevated temperature of toasting.

The concentrated water extract of the cereal is added to the soup or mash containing the cereal, sugar, salt, malt or other ingredients and cooked together, desirably at a temperature in excess of 225° F. and preferably in excess of 250° F. For example, the cereal together with the sugar and other flavoring ingredients and also the concentrated water extract of the cereal prepared in the aforesaid manner may be placed in a closed steam cooker and in the presence of moisture where the cereal may be cooked before being spread into flakes or ribbons and before toasting.

Between about 0.05% to 5% of the concentrated water extract of the cereal based upon its solids weight may be added against the solids weight of the cereal which is cooked, although between 0.5% and 1% is preferably added.

Following the cooking operation the cooked cereal containing the concentrated water extract may be rolled or compressed into flakes or shavings and run into a toasting oven between 400° F. and 650° F. until the proper degree of toasting has been applied.

As a result of the high temperature toasting treatment to which the concentrated water extract is subjected after thorough admixture into the cereal mash or soup, the resultant toasted flaked cereal is substantially stabilized against oxidative deterioration.

Another method for using the concentrated water extract is to dissolve the extract in water and to spray the water containing the extract on the surface of the ribbons or flakes of the cereal after the preliminary cooking has been completed and before toasting.

For example, the concentrated water extract may be mixed in water containing sugar and salt, as for example, a solution may be prepared comprising 10% of the concentrated water extract of maize flour, 5% of sugar and 1.5% of salt and this combination sprayed on the cereal flakes before they go into the toasting oven, applying to the cereal approximately 5% by weight of this water containing these various ingredients.

By this means, following the toasting operation, the flaked toasted cereal will be materially improved in keeping quality and will not develop the characteristic board or cardboard odors within the normal period of time.

In view of the fact that these concentrated water extracts contain water soluble sugars, the amount of sugar normally applied or mixed in with the cereal before final toasting may be reduced in view of the sweetening effect of the concentrated extract.

The concentrated water extracts become materially enhanced or increased in antioxygenic effectiveness when added to the cereal and then subjected to the elevated temperature of toasting and unless the extract is added to the cereal before or while it is at the elevated temperature of toasting, the full antioxygenic effect is not obtained.

It is desirable to use the concentrated water extracts of the cereals in the treatment of the cereal products before toasting inasmuch as where the unconcentrated extracts are employed, the desired degree of stabilization is not obtained. For example, unless the solvent, such as water, is substantialy entirely evaporated off after the extraction of the cereal with the water, the desired stabilization is not obtained and the most effective stabilization is obtained when the extract used is first evaporated to in excess of 50% total solids before addition to the cereal mash or soup or before spraying on the cereal ribbons before the toasting operation.

Having described my invention, what I claim is:

1. A method of producing stabilized toasted whole wheat breakfast cereals which comprises extracting an unbleached cereal selected from the group consisting of oats, maize and barley with slightly acidified water, concentrating the extract, applying said extract to the whole wheat cereal before toasting, and then drying and toasting the cereal containing the extract.

2. A method of producing stabilized toasted whole wheat breakfast cereals which comprises extracting an unbleached cereal selected from the group consisting of oats, maize and barley with a solvent selected from the group consisting of water and alcohol, concentrating the extract, applying said extract to the whole wheat cereal before toasting, and then drying and toasting the cereal containing the extract.

3. A method of producing stabilized toasted whole wheat breakfast cereals which comprises extracting maize with a solvent selected from the group consisting of water and alcohol, concentrating the extract, applying said extract to the whole wheat cereal before toasting, and then drying and toasting the cereal containing the extract.

4. A method of producing stabilized toasted whole wheat flakes which comprises extracting an unbleached cereal selected from the group consisting of oats, maize and barley with a solvent selected from the group consisting of water and alcohol, concentrating the extract, applying said extract to the whole wheat cereal before toasting, and then drying and toasting the whole wheat flakes containing the extract at a temperature of over 250° F.

5. A method of producing stabilized toasted whole wheat breakfast cereals which comprises extracting maize with slightly acidified water, concentrating the extract, applying said extract to the whole wheat cereal before toasting, and then drying and toasting the cereal containing the extract.

SIDNEY MUSHER.